Patented July 3, 1951

2,559,259

UNITED STATES PATENT OFFICE 2,559,259

METHOD OF MAKING A SOURCE OF BETA RAYS

John R. Raper, Lake Geneva, Wis., assignor to the United States of America as represented by the United States Atomic Energy Commission No Drawing. Application May 16, 1946, Serial No. 670,297

11 Claims. (Cl. 204—154)

This invention relates to a method of making a source of beta rays. More particularly, this invention relates to a method of making a source of beta rays which involves irradiating a shaped plastic material containing a potential beta emitter.

Sources capable of emitting beta rays of high intensity are desirable tools for use in biological experimentation as well as in various fields of medicine. The majority of sources of beta rays are unsuitable for use in such fields for a variety of reasons including short half life, contamination with gamma emitters and the like. It has been found that certain isotopes such as $P^{32}$ are capable of emitting substantially pure beta rays of high intensity. However, because of the intensity of radiation, a considerable problem is presented in fabricating source materials containing beta emitters of the type described above.

It is accordingly an object of this invention to provide a method of producing a source of substantially pure beta rays.

It is a further object of this invention to provide a method of producing a source of substantially pure beta rays which enables irradiation of the material following incorporation of a potential beta emitter therein.

These and other objects will become apparent to the skilled worker in the art upon becoming familiar with the following description.

I have found that a source of beta emissions which are substantially pure may be prepared by incorporating a potential beta emitter such as red phosphorous into a suitable plastic, forming the resulting mixture into the desired shape, and thereafter irradiating the resulting shaped article to obtain a source which is relatively pure in beta emissions and which yields beta rays of extremely high intensity.

Generally speaking, in the practice of my invention any plastic which is capable of withstanding the temperatures of a neutronic reactor, such as a graphite pile, may be utilized to obtain the source materials. Examples of such plastics are phenolaldehyde resins, for example, phenolfurfuraldehyde resins, or phenol-formaldehyde resins; and acrylic resins, for example, polymethyl methacrylate resins, and the like. I have obtained particularly advantageous results by utilizing phenol-formaldehyde in the fabrication of the source materials of the invention, particularly when reactor temperatures exceed 85° C.

In preparing a source material or plaque in accordance with my invention, a potential beta emitter such as red phosphorous is incorporated by any suitable means in the desired resin or plastic material. For example, the potential beta emitter, advantageously in the form of a powder, may be admixed with a finely divided molding powder of the desired plastic. The resulting mixture may then be molded to the desired shape and the shaped article subjected to neutron irradiation.

Another method of incorporating the potential beta emitter is that which involves adding it in the form of a powder to a boiling casting resinoid. After thus admixing the potential beta emitter and resinoid, the mixture may be cast in a suitable mold and polymerized by the application of heat. The thus shaped article may then be activated by neutron bombardment to obtain a source of beta rays.

Upon activation of the potential beta emitter, the fabricated plaque is then withdrawn from the reactor and aged for a period of time sufficient for the stabilization of any radioactive material which may be present in the plastic. Generally speaking, a period of aging of approximately one to two weeks has been found to be sufficient to inactivate any activity which is due to the plastic material.

My invention may be more readily understood by reference to the following specific examples which are given by way of illustration and which are not to be construed in a limiting sense.

Example I

Equal parts by weight of amorphous red phosphorous and a fine grain poly-methacrylate molding powder softened by the addition of monomeric methyl methacrylate were admixed to obtain a dough-like mixture which was cast between glass plates and heated at 50° C. for one day to polymerize the added monomer. The resulting fabricated material was then exposed to neutrons in a graphite pile for a period of seven days. The phosphorous impregnated acrylic resin was ready for use immediately upon removal from the pile since the resin, itself, did not become radioactive during exposure.

Example II

Equal parts by weight of phenol-formaldehyde resin molding powder and red phosphorous were admixed and molded by compression at 140° C. and 3000 lbs. per square inch in a small laboratory molding press. The resulting shaped article was then exposed to neutron irradiation in a graphite pile for a period of about one week. Upon removal from the pile the resin, itself, was found to be radioactive, but upon aging for a period of about seven days, the activity substantially completely disappeared.

Example III

Equal parts by weight of red phosphorous and a phenol formaldehyde casting resinoid were admixed by bringing the resinoid to its boiling point and adding the powdered phosphorous thereto. The mixture was cast in a shallow mold and polymerized at 90° for 16 hours followed by 120 to 150° C. for 8 hours. The resulting shaped article was then subjected to neutron irradiation in a graphite pile for a period of one week and upon removal therefrom was found to be intensely radioactive. Aging of the article for about 7 days inactivated the resin, itself, and left a source of substantially pure beta rays.

If desired, the plastic containing the potential beta emitter may be varnished prior to activation. For this purpose a resin varnish thinned with acetone may be applied and polymerized at 125° for 150° C. for several hours such as 8 hours. The thin layer of varnish prevents contamination of objects with which the activated sources come into contact. In the case of red phosphorous, it eliminates the objectionable odor commonly associated therewith. Plaques may be prepared in accordance with my invention and shaped to any desired shape so as to conform with various parts of the body and to be used as a source of pure beta rays for medical treatment. Plaques such as those described herein may be employed to kill surface rash, surface tumors or other malady which is not deeply seated. Any fungus such as ring worm which would ordinarily be treated with X-rays may be effectively treated with plaques prepared in accordance with my invention.

Generally speaking, the activity emitted from source materials prepared in accordance with my invention is of the order of $2 \times 10^4$ r. 30 hr.$^{-1}$ and may be as high as $10^7$ r. hr.$^{-1}$. In view of this intense radiation, it is particularly advantageous to prefabricate the source material prior to radiation.

While the invention has been partly described with reference to $P^{32}$ as a source of beta rays, other sources such as $Sr^{89}$ and the like may be employed. The $P^{32}$ may be obtained by neutron bombardment of $P^{31}$ by the following reaction $P^{31}(n,\gamma)P^{32}$ or, if desired by neutron bombardment of $S^{32}$ with the following eraction $S^{32}(n,p)P^{32}$. Thus powdered sulfur may be utilized in preparing plaques in accordance with my invention.

For less intense sources of beta emissions, $Sr^{89}$ may be utilized and may be obtained by the following reaction $Sr^{88}(n,\gamma)Sr^{89}$. Strontium carbonate may be incorporated in a plastic and irradiated to obtain a source material.

While my invention has been described with reference to certain specific examples and with reference to certain particular embodiments, it is to be understood that the invention is not limited thereby. Therefore, changes, ommissions and/or additions may be made without departing from the spirit of the invention as defined in the appended claims which are intended to be limited only as required by the prior art.

I claim:

1. A process of preparing a source of beta emissions which comprises admixing red phosphorous with a phenol formaldehyde resin, shaping the resulting mixture into a desired shape and subjecting the shaped mixture to neutron irradiation.

2. A process of preparing a source of beta emissions which comprises admixing red phosphorous with polymethyl methacrylate resin, shaping the resulting mixture and subjecting the shaped mixture to neutron irradiation.

3. A process of preparing a source of beta emissions which comprises admixing strontium with a phenol formaldehyde resin, shaping the resulting mixture into a desired shape and subjecting the shaped mixture to neutron irradiation.

4. A process of preparing a source of beta emissions which comprises admixing strontium with polymethyl methacrylate resin, shaping the resulting mixture and subjecting the shaped mixture to neutron irradiation.

5. A method of preparing a source of beta rays which comprises admixing powdered sulfur with a phenol formaldehyde resin, shaping the resulting mixture, and subjecting the shaped mixture to neutron irradiation.

6. A method of preparing a source of beta rays which comprises admixing powdered sulfur with a polymethyl methacrylate resin, shaping the resulting mixture, and subjecting the shaped mixture to neutron irradiation.

7. A method of preparing a plaque capable of emitting beta rays which comprises admixing a finely divided potential beta emitter with a phenol-aldehyde resin molding powder, molding the resulting mixture to a predetermined shape and subjecting the molded article to neutron irradiation.

8. A method of preparing a plaque capable of emitting beta rays which comprises admixing a finely divided potential beta emitter with an acrylic resin molding powder, molding the resulting mixture to a predetermined shape and subjecting the molded article to neutron irradiation.

9. A method of preparing a plaque capable of emitting beta rays which comprises adding a finely divided potential beta emitter to a boiling casting organic resinoid containing no component elements in addition to carbon, hydrogen, and oxygen, casting the resulting admixture into a predetermined shape, and subjecting the resulting cast object to neutron irradiation.

10. A process of preparing a source of beta emissions which comprises admixing an isotope capable of being irradiated by neutrons to produce a beta emitter with an organic resin containing no component elements other than carbon, hydrogen, and oxygen, shaping the resulting mixture into a desired shape, and subjecting the shaped mixture to neutron irradiation.

11. A method of preparing a plaque capable of emitting beta rays which comprises admixing a finely divided potential beta emitter with a phenol-aldehyde resin, shaping the resulting mixture, and subjecting the shaped mixture to neutron irradiation.

JOHN R. RAPER.

REFERENCES CITED

The following references are of record in the file of this patent:

UNITED STATES PATENTS

| Number | Name | Date |
| --- | --- | --- |
| 1,594,491 | Bilstein | Aug. 3, 1926 |
| 2,206,634 | Fermi et al. | July 2, 1940 |

OTHER REFERENCES

Nature, volume 135, pp. 956-7 (1935).

Proc. Phys. Soc. (London), 50, pp. 438-440 (1938).

Webster's International Dictionary, page 1883, G. & C. Merriam (1940).